United States Patent
Raymond et al.

(10) Patent No.: US 8,422,768 B2
(45) Date of Patent: Apr. 16, 2013

(54) METHOD FOR CONSTRUCTING PROTOTYPE VECTORS IN REAL TIME ON THE BASIS OF INPUT DATA OF A NEURAL PROCESS

(75) Inventors: Pierre Raymond, Heimsbrunn (FR); Alexander Pichler, Altkirch (FR)

(73) Assignee: Institut Franco-Allemand de Recherches de Saint-Louis, Saint Louis (FR)

( * ) Notice: Subject to any disclaimer, the term of this patent is extended or adjusted under 35 U.S.C. 154(b) by 669 days.

(21) Appl. No.: 12/591,216

(22) Filed: Nov. 12, 2009

(65) Prior Publication Data
US 2010/0166297 A1    Jul. 1, 2010

(30) Foreign Application Priority Data
Nov. 14, 2008    (FR) ..................... 08 06334

(51) Int. Cl.
*G06K 9/62* (2006.01)
(52) U.S. Cl.
USPC .......................................... 382/156
(58) Field of Classification Search ............... 382/156
See application file for complete search history.

(56) References Cited

U.S. PATENT DOCUMENTS

| | | | |
|---|---|---|---|
| 5,712,922 A | 1/1998 | Loewenthal et al. | |
| 6,211,971 B1* | 4/2001 | Specht | 358/1.9 |
| 2007/0133902 A1* | 6/2007 | Kumar | 382/298 |
| 2008/0024631 A1* | 1/2008 | Tani et al. | 348/264 |
| 2009/0129699 A1 | 5/2009 | Beikirch et al. | |

FOREIGN PATENT DOCUMENTS
WO    WO 2005/073911 A1    8/2005

OTHER PUBLICATIONS

Schafter+Kirchhoff; "CCD-Zeilenkamera Digital s/w SK7500CTO;" *Technisches Handbuch*; Apr. 2005; pp. 1-14; Hamburg, Germany.
French Search Report conducted Sep. 30, 2009 in corresponding French Patent Application No. 08/06334 (with translation).

* cited by examiner

*Primary Examiner* — Bhavesh Mehta
*Assistant Examiner* — Nirav G Patel
(74) *Attorney, Agent, or Firm* — Oliff & Berridge, PLC

(57) ABSTRACT

A method for processing images consisting of pixels generated by an image sensor with a view to supplying input data to a simulated or wired neural process. The method includes reading pixels pixel-by-pixel in real time and constructing prototype vectors during the pixel-by-pixel reading process on the basis of the values read, the prototype vectors constituting the input data of the neural process.

7 Claims, 8 Drawing Sheets

Figure 1:
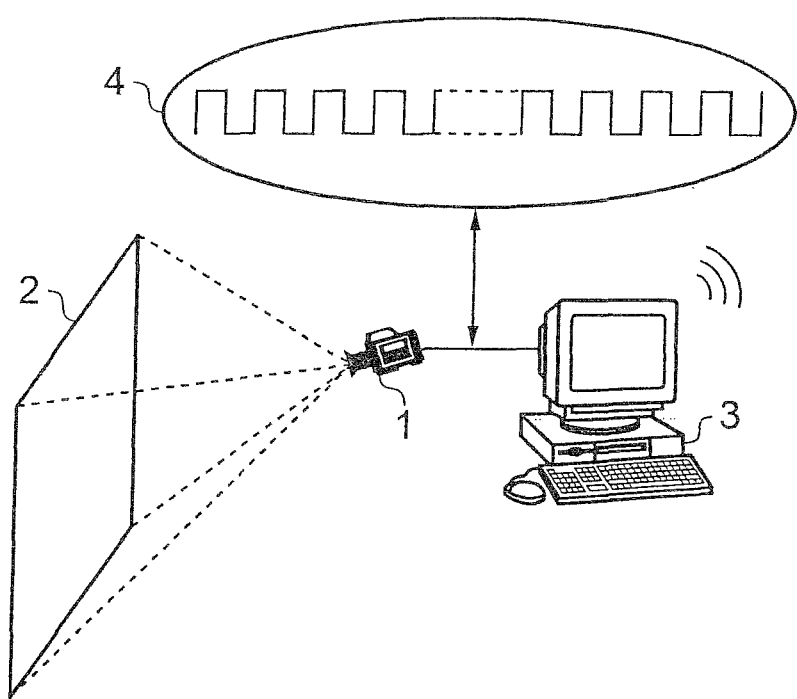

METHOD FOR CONSTRUCTING PROTOTYPE VECTORS IN REAL TIME ON THE BASIS OF INPUT DATA OF A NEURAL PROCESS

The technical field of the invention is that of processing or generating image data, and it more particularly relates to a method for constructing prototype vectors in real time on the basis of input data in order to supply a neural process. The invention, in relation to a real-time signal processing method, is associated with a simulated or wired neural process for applications in global environmental perception and movement analysis.

There are already several methods for the problem of processing a signal associated with a neural process in real time, in particular that of storing data of a sensor in a memory then using these data in a processing program implemented by a conventional dedicated structure of the computer (microprocessor)/algorithm type. In this regard patent U.S. Pat. No. 5,701,397 is known, which describes a circuit pre-charging an input vector of a neural process during a phase of recognizing free neural circuits. Specifically, the pre-charge circuit is defined as a memory contained in each neural circuit, by virtue of which the same input data are stored in all the said neural circuits and a memory control signalling device makes it possible to transfer the memory to output ports when the said associated circuit is free. During this last phase, the memory of the circuit cannot then be modified.

Conventional image processing methods often require the provision of a buffer memory zone which saves the image of the scene as presented by the sensor, which already constitutes a first constraint. Furthermore, the algorithms for processing the information employ complex algorithms based on pointers in each buffer memory in order to extract the useful information from it, and the computerised manipulation of these pointers slows down the processing significantly, which constitutes a second constraint. Lastly, the information is manipulated at least twice, first at the time of reading the information coming from the sensor and secondly at the time of its manipulation by the algorithm, which constitutes a third constraint. Such methods, particularly in the case of processing by a wired or programmed neural network, have in particular the drawback of manipulating the same information several times, on the one hand by storing the said information in memory before construction of the prototype vectors then, on the other hand, by construction of the input vector of the neural process. These methods therefore give rise to latencies which may be problematic in particular for dual on-board applications that have to function in real time. The memory resources as well as the computation times are therefore the major drawbacks of these methods.

It is one of the objects of the invention to resolve this drawback by providing a method for constructing prototype vectors in real time on the basis of input data of a neural process without manipulating the same data twice, that is to say without having to store all the information in memory, and by constructing the prototype vectors as the sensor is being read.

The solution provided is a method for constructing prototype vectors, characterised in that it forms the prototype vectors intended to supply input data to a simulated or wired neural process during the process of reading an image sensor serially pixel by pixel, or sequentially in a buffer memory. Furthermore, this method is characterised in that the reading of the pixels progresses with each clock cycle, a clock cycle corresponding to the reading of one pixel. According to a particular characteristic, the image, expressed by a matrix [N,M] of pixels where N represents the number of lines and M the number of columns of the matrix, each element of the matrix or number representing the value of one pixel, is read sequentially by means of an organised scan of an observation zone by a region of interest expressed by a matrix [n,m] (with n<N and m<M). The image represented by the matrix [N,M] is then the observation zone, although it is possible to select a more precise observation zone corresponding to a subsection of an image. The said scan of an observation zone is characterised in that it comprises an initialisation step then the following steps in a loop:

displacing the region of interest in the observation zone, generating a new region of interest;

constructing a new intermediate vector based on this new region of interest;

constructing the prototype vector of the new region of interest on the basis of the said associated intermediate vector.

By this method, the region of interest will be virtually displaced horizontally from left to right then successively change line during its reading of the image, showing that it is not necessary to provide a buffer memory with a capacity equal to the observation zone. Thus, an intermediate vector will comprise as coordinates all image pixels lying between the first pixel of the region of interest and the last pixel of this same region of interest. The prototype vector associated with this intermediate vector will then correspond to this same vector from which the values of the pixels not contained in the region of interest have been removed. The said created prototype vectors may be saved locally if necessary, by a neuron, after having been sent to the neural network.

More precisely, the said initialisation phase corresponds to the creation of the first prototype vector and comprises the following steps:

reading the (n.M−[M−m]) first pixels of an image. Each clock cycle corresponds to the reading of one pixel, the number of clock cycles $N_{clk}$ necessary during this initialisation phase, before the first prototype vector is available, is given by the relation: $N_{clk}$=n.M−[M−m]. Specifically, this number of clock cycles corresponds to the number of pixels making it possible to construct the first intermediate vector, and a fortiori the first prototype vector;

constructing the first intermediate vector, a vector of dimension [1;(n.M−[M−m])] where the value of the coordinates (1;i) of the said intermediate vector corresponds to the value of the $i^{th}$ pixel read in the $i^{th}$ clock cycle;

constructing the first prototype vector, a vector of dimension [1;(1;(n.m)], which corresponds to the intermediate vector from which the values of the pixels not contained in the region of interest have been removed.

According to a particular characteristic, the virtual displacement of the region of interest corresponds to an offset p lying between 1 and m pixels for a horizontal displacement along a given line, and an offset q lying between 1 and n pixels for a vertical displacement along a given column. Specifically, for certain applications it is not necessary to make this region of interest slide from pixel to pixel. Various steps or offsets may be selected for the virtual line and column shifts. These offsets may be unitary, in which case each of the pixels will be included in a prototype vector.

Nevertheless, there may be extra pixels which correspond to the pixels at the end of a line or column, respectively, when the maximum number of column shifts of the region of interest along a given line, or the maximum number of line shifts of the region of interest along a given column, does not make it possible to read all the pixels at the end of a line or column, respectively.

In order to form the new intermediate vector following the initialisation phase, two cases may be envisaged: either the displacement takes place along a given line by an offset p, this being without the need for a line change, or the displacement of the region of interest needs to be carried out vertically because the said region of interest has arrived at the last line or, if extra pixels exist, the last line excluding extra pixels. The extra pixels, being read pixels, will contribute to the intermediate vector but will not be used to construct a prototype vector.

In the first case, the new intermediate vector, still of dimension [1;(n.M−[M−m])], after a displacement along a given line by an offset p, is characterised in that it is equal to the preceding intermediate vector in which the p first coordinates have been removed and the p new values of the new pixels read have been added after the last coordinates of the preceding intermediate vector. Specifically, the said intermediate vector, supplied by reading the information i.e. the pixels, may be considered as a circular memory register for which, at each clock cycle, one pixel is entered at the end of the register and the first is discarded.

After having exhausted all possibilities of column number shifts along a given line, and before constructing the following intermediate vector, still of dimension [1;(n.M−[M−m])], it is necessary to position the pixel pointer at the start of the next line of the matrix [N,M] then jump the following q lines. It is therefore necessary for the number K of extra pixels to be read and put into the intermediate vector. According to the notation above, the quantity K is defined in the following way: K=Modulo(M,(nb_M−1)*p+m)+m.

Thus, in the second case the construction of a new intermediate vector, still of dimension [1;(n.M−[M−m])], after a displacement requiring a change of lines by an offset q, is characterised in that it comprises the following steps:
automatically removing the first K coordinates of the preceding intermediate vector by reading the K new values of the new pixels read, the latter being added after the last coordinates of the said preceding intermediate vector, with K the number of extra pixels (13) equal to:

$$K = \mathrm{Modulo}(M,(nb\_M-1)*p+m) \div m$$

and nb_M the maximum number of column shifts along a given line equal to:

$$nb\_M = \frac{M-m}{p} + 1$$

removing the first K' coordinates of the preceding intermediate vector and adding the K' new values of the new pixels read, after the last coordinates of the said preceding intermediate vector, with K' the number of pixels corresponding to the shifts in the line indices equal to:

$$K' = (nb\_N-1)*M$$

and nb_N the maximum number of line shifts along a given column equal to:

$$nb\_N = \frac{N-n}{q} + 1.$$

The said extra pixels correspond to the pixels at the end of a line or column, when the maximum number of column shifts along a given line is not a multiple of p(nb_M)+1, or respectively when the maximum number of line shifts along a given column is not a multiple of q(nb_N)+1. These extra pixels will be read, but will not appear in the prototype vectors. Specifically, the new prototype vector of dimension [1;(n.m)] is then constructed by virtue of the data of the intermediate vector thus created. It is in fact characterised in that it corresponds to the intermediate vector associated with it, from which the values of the pixels not contained in the region of interest have been removed by successive shifts. The method of displacing the region of interest then terminates when the observation zone has been fully scanned by the said region of interest.

Figure 2:
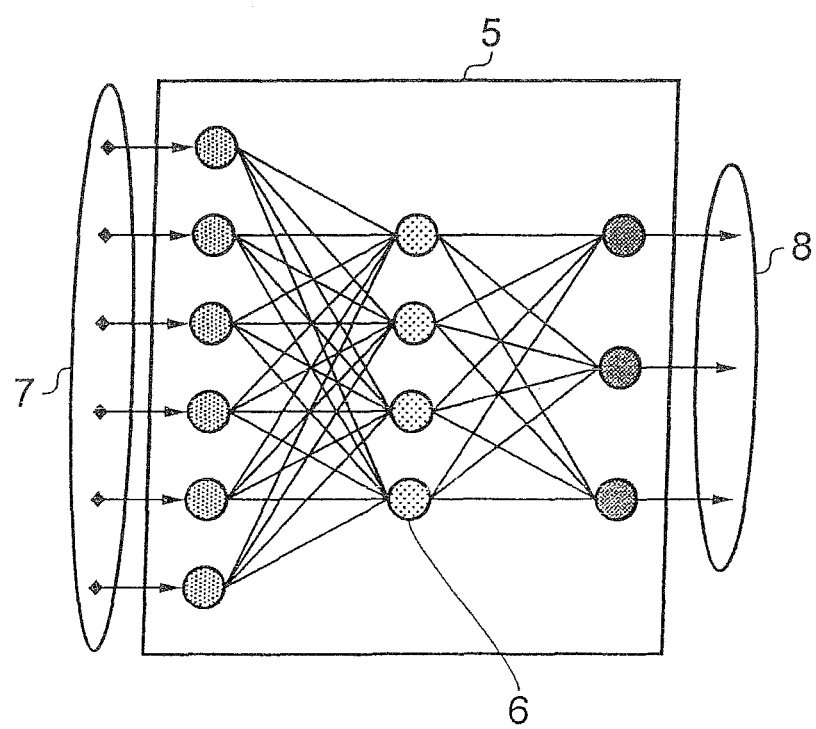
Figures 3A, 3B:
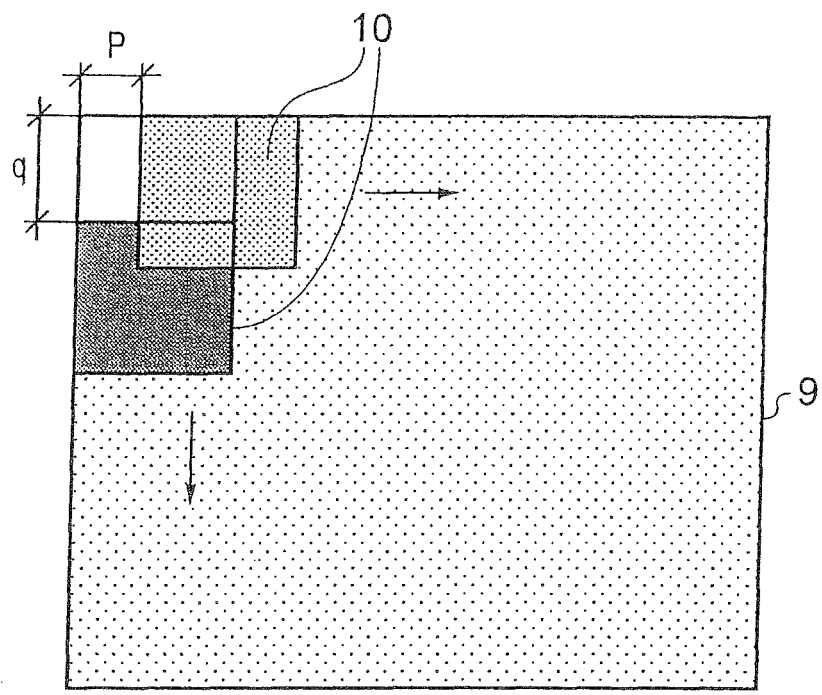
Figure 5A:
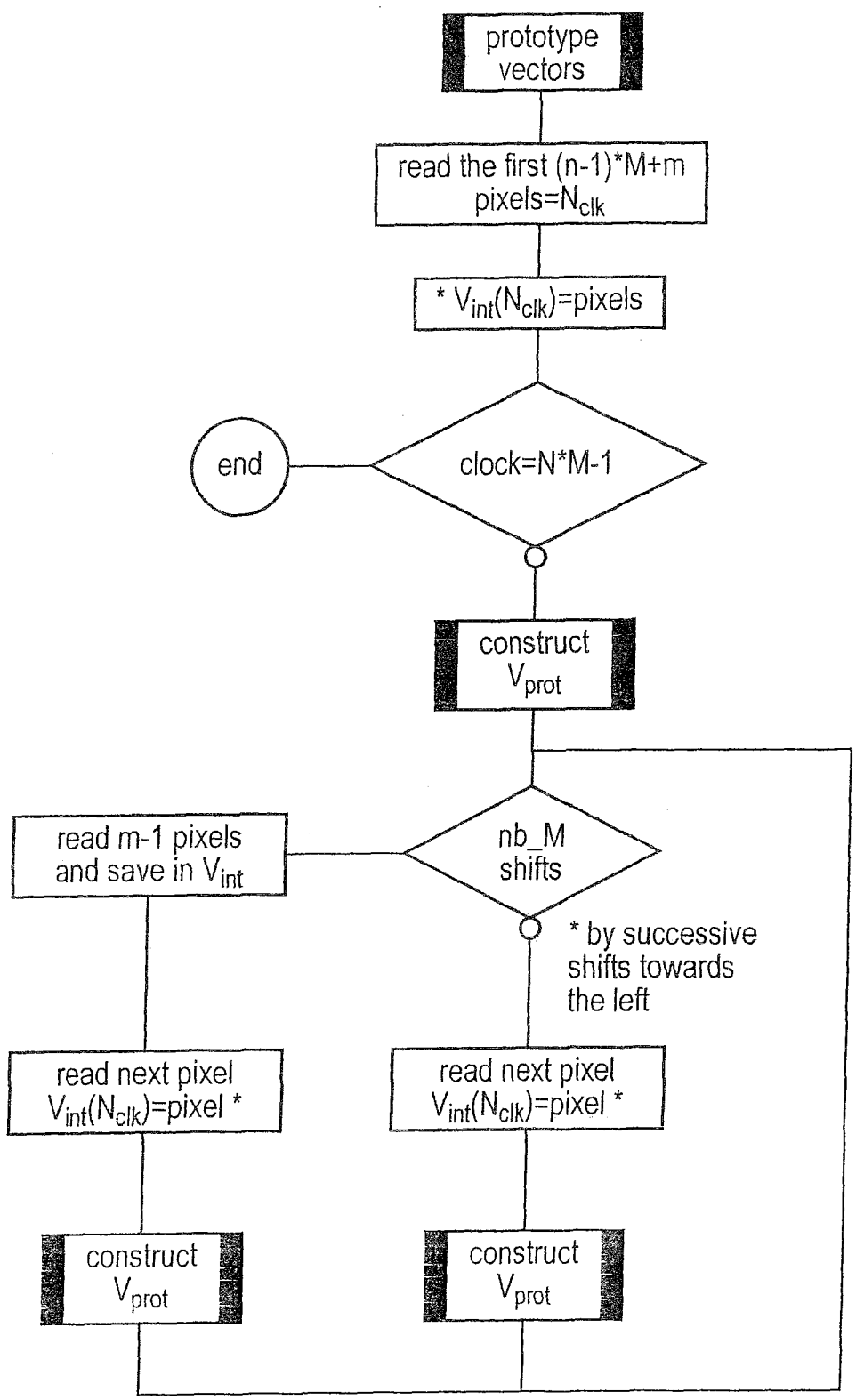
Figure 5B:
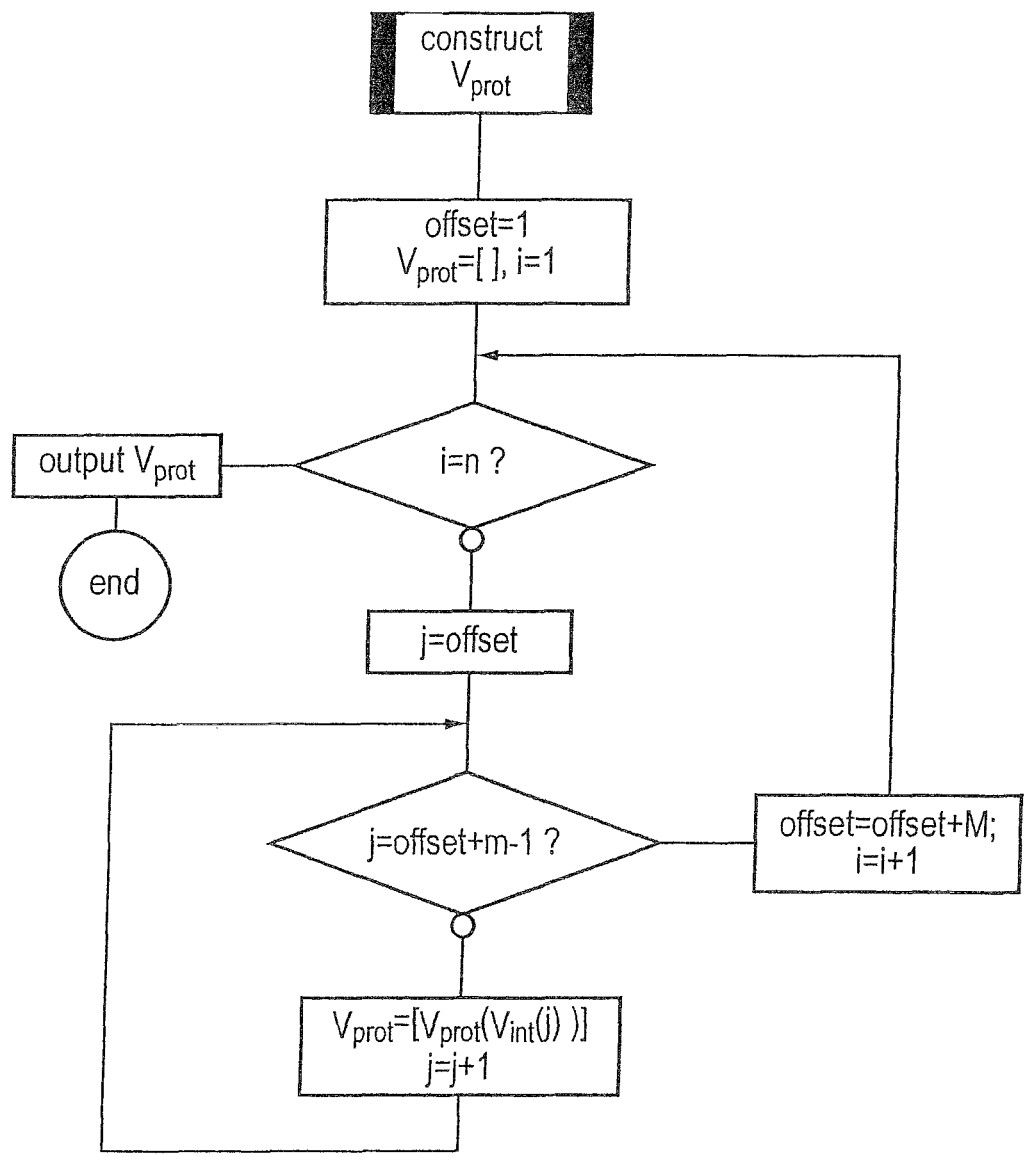
Figure 7A:
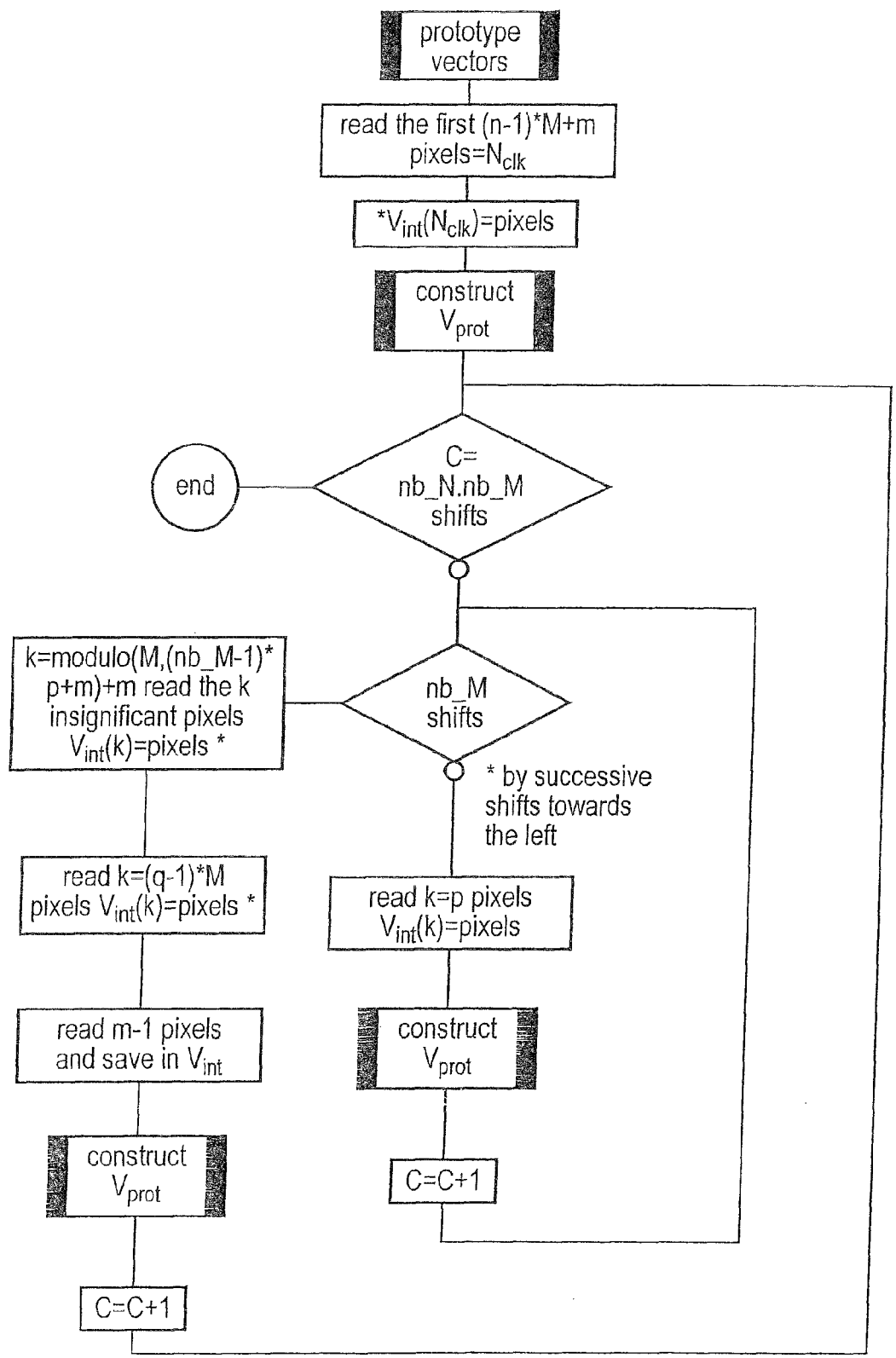
Figure 7B:
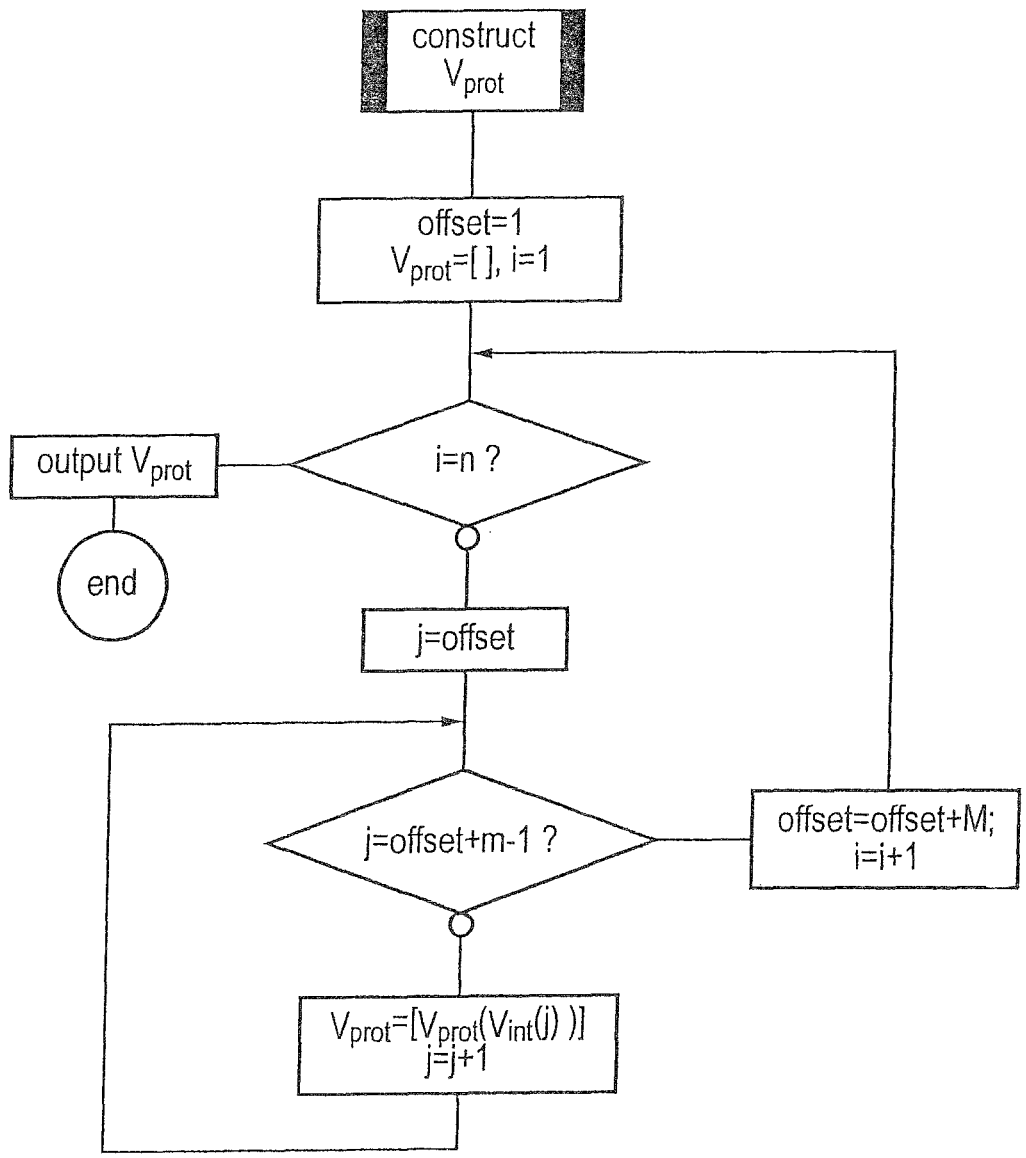

Other advantages and characteristics will become apparent in the description of several embodiments of the invention with reference to the appended figures, in which:

FIG. 1 shows a diagram of a device adapted to carry out the invention,

FIG. 2 shows a basic diagram of an entirely connected neural network with three layers: an input layer, a hidden layer and an output layer, FIGS. 3a and 3b show a basic diagram of the various matrices in question, FIGS. 4a, 4b, 4c and 4d present the main steps according to one embodiment, FIGS. 5a and 5b show the flow charts of a method according to one embodiment of the invention, FIGS. 6a, 6b, 6c and 6d present the main steps according to another embodiment, FIGS. 7a and 7b show the flow charts of a method according to another embodiment of the invention.

FIG. 1 shows a diagram of a device for carrying out the invention. A CCD sensor 1 is placed in front of a scene 2 to be observed. The sensor 1 is connected to a computation unit 3 receiving a stream of data 4 from the said sensor 1. The processing of the information is carried out by using a neural process in the central computation unit 3. This method could however also function on the basis of data archived in buffer memory and then used for the construction of prototype matrices [n,m] instead of a prototype vector $V_{prot}$ of dimension [1;(n.m)].

FIG. 2 shows a basic diagram of a neural network 5, itself composed of multiple elementary neural cells 6. In order to supply a neural network 5, the input data must be presented in the form of a prototype vector 7 or vector of characteristics. Such a vector is composed of all the characteristic elements which have already been adopted in order to define the object to be recognized in a scene. In its simplest version, it is composed of all the pixels of a region of interest of the said image. The output vector 8 therefore corresponds to the vector of the information after processing. Thus, the object of the invention is to construct the said prototype vectors 7 in real time, these being input vectors of the neural process, but without thereby being limited to this function. In fact, it also makes it possible to save time for image filtering operations.

FIGS. 3a and 3b show a basic diagram of the various matrices in question. Specifically, in FIG. 3a, a scene is expressed by an image 9 in which a region of interest 10 will be displaced with a view to scanning some or all of the said image or observation zone 9. This scan will be carried out in an organised fashion following the principle of sequentially reading the pixels. Specifically, the said region of interest 10 will be moved step by step, on the one hand horizontally by an offset p, and on the other hand vertically by an offset q when each line has been read. More precisely, in FIG. 3b an image 9 is expressed by a [7;9] matrix, each coordinate [N;M] of which represents the index of a pixel 11 (in reality its value). The said image 9 will be read by displacing a region of interest 10 expressed by a [3;4] matrix. The said region of interest 10 will be displaced step by step horizontally from left to right by an offset p then, at the end of a line, it will return to the start of the line and be displaced by an offset q, and so on until all the pixels have been read once and only once.

FIGS. 4a, 4b, 4c and 4d present the main steps of the invention according to one embodiment, that is to say by taking the offsets p and q each equal to one. For their part, FIGS. 5a and 5b illustrate this embodiment in the form of flow charts. The first step in the method for constructing prototype vectors or the initialisation step, presented in FIG. 4a, is to form the first prototype vector. Thus, it is first necessary to read the first pixels lying between the first pixel of the region of interest 10 (which is also the first pixel of the image 9 during the step) and the last pixel of the said region of interest 10 with a view to creating the first intermediate vector $V_{int}^1$. The set of all the pixels 12 forms the set of all the coordinates of the said intermediate vector, for this example of dimension (1;22). Since one pixel is read in each clock cycle, the first prototype vector will be created at the end of the first 22 clock cycles. Once the said first 22 pixels have been read, the first intermediate vector is then formed as:

$V_{int}^1$=[1 2 3 4 5 6 7 8 9 10 11 12 13 14 15 16 17 18 19 20 21 22].

Since the associated prototype vector is equal to the intermediate vector in which the values of the pixels not lying in the region of interest 10 have been removed, for this example it is therefore equal to:

$V_{prot}^1$=[1 2 3 4 10 11 12 13 19 20 21 22].

Following this initialisation step (after the 22$^{nd}$ clock cycle according to this embodiment of the invention), and in each clock cycle, all the pixels read afterwards are included in series in the intermediate vector. The operation consists in eliminating the first value of $V_{int}$, then shifting all the values by one position and acquiring the new value (FIG. 4b):

$V_{int}^2$=[2 3 4 5 6 7 8 9 10 11 12 13 14 15 16 17 18 19 20 21 22 23], then the new prototype vector is constructed according to the previous scheme, that is to say for this example:

$V_{prot}^2$=[2 3 4 5 11 12 13 14 20 21 22 23]. The new prototype vector appears immediately after the 23$^{rd}$ clock cycle. The maximum number of possible column shifts of the region of interest in the observation zone is:

$$nb\_M = \frac{M-m}{p} + 1 = \frac{9-4}{1} + 1 = 6.$$

For this example, the last allowed shift of the column type provides the following intermediate and prototype vectors (FIG. 4c):

$V_{int}^6$=[6 7 8 9 10 11 12 13 14 15 16 17 18 19 20 21 22 23 24 25 26 27]

$V_{prot}^6$=[6 7 8 9 15 16 17 18 24 25 26 27].

When the number of column shifts is exhausted, the region of interest 10 changes line. The maximum number of possible line shifts of the region of interest in the observation zone is, for this example:

$$nb\_N = \frac{N-n}{q} + 1 = \frac{7-3}{1} + 1 = 5.$$

To continue exploring the image 9, the processing means used in the device adapted to carry out the invention read the next "m" pixels in order to position the pixel pointer at the start of the next line. More precisely, this pointer is quite simply the clock which makes it possible to read the pixels one by one per clock cycle. For this example (FIG. 4d), m=4 (pixels 28 29 30 and 31 have to be read in order to form the new prototype vector):

$V_{int}^7$=[10 11 12 13 14 15 16 17 18 19 20 21 22 23 24 25 26 27 28 29 30 31]

$V_{prot}^7$=[10 11 12 13 19 20 21 22 28 29 30 31].

There is thus an additional delay of "m" clock cycles. The displacement of the region of interest 10 stops when each pixel has been read once and only once, that is to say when it has been possible to create all the prototype vectors.

FIGS. 5a and 5b illustrate this example in the form of flow charts. Specifically, the fact that there are unitary offsets in this embodiment implies that there are no extra pixels, which makes it possible to simplify the steps of the method for constructing the prototype vectors, and hence to schematise the method by means of a simplified flow chart.

FIGS. 6a, 6b, 6c and 6d present the main steps of the invention according to another embodiment, that is to say taking offsets p=3 and q=2. For their part, FIGS. 7a and 7b illustrate this embodiment in the form of flow charts. The first step in the method for constructing prototype vectors or the initialisation step, presented in FIG. 6a, is to form the first prototype vector. Thus, as in the previous example, the intermediate and prototype vectors obtained during this step are equal to:

$V_{int}^1$=[1 2 3 4 5 6 7 8 9 10 11 12 13 14 15 16 17 18 19 20 21 22]

$V_{prot}^1$[1 2 3 4 10 11 12 13 19 20 21 22].

In order to construct the second prototype vector, it is necessary to read the next p pixels, then the operations corresponding to the shifts can actually begin (FIG. 6b). This gives the following intermediate and prototype vectors:

$V_{int}^2$=[4 5 6 7 8 9 10 11 12 13 14 15 16 17 18 19 20 21 22 23 24 25]

$V_{prot}^2$=[4 5 6 7 13 14 15 16 22 23 24 25].

According to this example, only two line shifts are possible. Before constructing the next intermediate vector $V_{int}^3$, which will make it possible to construct the following prototype vector, the processing means first position the pixel pointer at the start of the next line then jump the next q lines. The said processing means therefore read the number K of extra pixels 13, where K=6, and put them into the vector $V_{int}^2$ (FIG. 6c). The intermediate vector obtained is then the following (removing the first 6 coordinates of the preceding intermediate vector and adding the 6 new values of the new pixels read, after the last coordinates of the said preceding intermediate vector):

$V_{int}$=[11 12 13 14 15 16 17 18 19 20 21 22 23 24 25 26 27 28 29 30 31].

Secondly, the offset corresponding to the shift in the line indices must be taken into account. The said processing means therefore read the following K' pixels, with K'=(q−1)*M=(2−1)*9=9, and put them into the intermediate vector $V_{int}$. For this example, reading the following 9 pixels makes it possible to position the pointer at the start of the first line to be treated. The vector $V_{int}^3$ thus obtained is therefore (FIG. 6d):

$V_{int}^3$=[19 20 21 22 23 24 25 26 27 28 29 30 31 32 33 34 35 36 37 38 39 40].

The associated prototype vector is then deduced therefrom:

$V_{prot}^3$=[19 20 21 22 28 29 30 31 37 38 39 40]. And so on progressively.

FIGS. 7a and 7b illustrate this example in the form of flow charts. The fact of using the offsets with p=3 and q=2 in this embodiment implies the existence of extra pixels. These flow charts therefore illustrate the scheme of the method for constructing prototype vectors in real time on the basis of input data of a neural process in its most general configuration. Furthermore, a computer test of the method according to this embodiment, for processing an observation zone 9 of 64×64 pixels with a region of interest 10 of 16×16 pixels, i.e. a prototype vector with 256 elements, has made it possible to reduce the computation time from 218 ms to 46 ms.

Numerous modifications may be made to the embodiment described above, without departing from the scope of the invention.

For instance, the displacement of the region of interest may be carried out first vertically, then horizontally. Specifically, according to one proposed embodiment, the region of interest is displaced horizontally by an offset p then a line change by an offset q as the said displacement progresses. Similarly, according to another embodiment, the said region of interest may be displaced vertically by an offset q then a column change by an offset p as the said displacement progresses. Furthermore, it is possible to select a specific analysis zone of an observation zone, that is to say to restrict the scan by the region of interest in the observation zone. In fact, in the embodiments presented, the method according to the invention is directly linked with the physical principle of reading a CCD matrix or a CMOS sensor. For these components, the pixels are read in serial mode from first to last, that is to say the observation zone was scanned fully by the region of interest. Thus, the reading of an image or observation zone expressed by a matrix [N,M] (with N lines and M columns, for which each of the coordinates of this matrix represents the value of a pixel) is synchronised by two electronic signals: frame valid and line valid. A CCD image [n,m] is composed of "n" lines of "m" pixels. The signals make it possible by default to read all of the CCD. However, the CCD can be read by electronically forcing the line-valid signal to zero during the reading, therefore starting to acquire the pixels only from line No. x to line No. y. Furthermore, by modifying the activation and deactivation times of the line-valid signal for each line, only the "n1" pixels belonging to the observation zone are validated and thus the method is not modified. The timing of the electronic signal may be managed in real time by an electronic drive circuit of the FPGA type or the like. Finally, another option which may be envisaged is to manage the sectorised reading of the CCD through adaptation of the method by using counters and pointers to remove the extra pixels not belonging to the observation zone. In this case, it is necessary to adapt the algorithm (minor modification). All the CCD must be read in both cases, and there will therefore be neither a gain nor loss of performance. This algorithm has been developed with the assumption that the position of the observation zone must change over time and as a function of the application (region of interest with a variable dimension).

The invention claimed is:

1. A method for processing images expressed by matrixes [N,M] consisting of pixels, each digit representing a value of one pixel, generated by an image sensor with a view to supplying input data to a simulated or wired neural process, comprising:
    a step of reading pixels pixel-by-pixel in real time by processing means of an organized scan of a region of interest, expressed by a matrix [n,m], with n<N and m<M and [n, m] a part of [N,M], the reading of the pixels progresses with each clock cycle in real time, a clock cycle corresponding to the reading of one pixel; and
    a step of constructing prototype vectors during the pixel-by-pixel reading process on a basis of the values read, the prototype vectors constituting the input data of the neural process,
    wherein the scan comprises an initialization step then the following steps in a loop:
    displacing the region of interest in an observation zone by sequential reading of the pixels;
    generating a new region of interest;
    constructing an intermediate vector based on the new region of interest; and
    constructing a prototype vector of the new region of interest on a basis of an associated intermediate vector, the prototype vectors constituting the input data of the neural process.

2. The method according to claim 1, wherein the initialization step comprises the following steps:
    reading (n.M-[M-m]) first pixels of an image;
    constructing a first intermediate vector of dimension [1; (n.M-[M-m])] where a value of coordinates (1;i) of the first intermediate vector corresponds to a value of one pixel read in one clock cycle; and
    constructing a first prototype vector of dimension [1;(n, m)], which corresponds to the first intermediate vector from which values of pixels not contained in the region of interest have been removed.

3. The method according to claim 2, wherein a displacement of the region of interest corresponds to an offset p lying between 1 and m pixels for a horizontal displacement along a given line and an offset q lying between 1 and n pixels for a vertical displacement along a given column.

4. The method according to claim 3, wherein a new intermediate vector of dimension [1;(n.M-[M-m])], after a displacement along a given line by the offset p, is equal to a preceding intermediate vector in which first p coordinates have been removed and new p values of new pixels read have been added after last coordinates of the preceding intermediate vector.

5. The method according to claim 4, wherein construction of a new intermediate vector of dimension [1;(n.M-[M-m])], after a displacement requiring a change of lines by the offset q, comprises the following steps:
    removing first K coordinates of the preceding intermediate vector and adding new K values of new pixels read, after the last coordinates of said preceding intermediate vector, with K, a number of extra pixels equal to:

$$K = \mathrm{Modulo}(M, (nb\_M-1)*p+m)+m$$

and nb_M, a maximum number of column shifts along a given line equal to:

$$nb\_M = \frac{M-m}{p} + 1$$

removing first K' coordinates of the preceding intermediate vector and adding K' new values of the new pixels read, after last coordinates of said preceding intermediate vector, with K', a number of pixels corresponding to shifts in line indices equal to:

$$K' = (nb\_N-1)*M$$

and nb_N, a maximum number of line shifts along a given column equal to:

$$nb\_N = \frac{N-n}{q} + 1.$$

6. The method according to claim 1, wherein a prototype vector of dimension [1;(n.m)] corresponds to the associated intermediate vector, from which the values of the pixels not contained in the region of interest have been removed.

7. The method according to claim 1, wherein reading the image terminates when the region of interest has scanned an entire image or the observation zone which occurs when all the pixels of the image have been read at least once.

* * * * *